United States Patent

[11] 3,600,680

[72] Inventors Maurice A. Maniere; Jacques K. Melle, both of Paris, France
[21] Appl. No. 27,711
[22] Filed Apr. 13, 1970
[45] Patented Aug. 17, 1971
[73] Assignee Lignes Telegraphiques Et Telephoniques Paris, France
[32] Priority Sept. 22, 1969, Dec. 18, 1969, Jan. 31, 1970
[33] France
[31] 32150, 43899 and 03264

[54] FSK DEMODULATOR AND MODULATOR COMBINING DIFFERENTIATED COUNTED SIGNALS INTO A WEIGHTED ANALOG OUTPUT

9 Claims, 10 Drawing Figs.

[52] U.S. Cl. .......... 325/18, 325/163, 325/320, 178/66, 178/88, 329/126, 332/9
[51] Int. Cl. .......... H04b 1/40, H04l 27/14
[50] Field of Search .......... 325/18, 21, 30, 163, 320; 178/66, 88; 329/104, 126, 1.2; 332/9

[56] References Cited

UNITED STATES PATENTS

| | | | |
|---|---|---|---|
| 3,412,205 | 11/1968 | Saeger | 178/88 |
| 3,466,550 | 9/1969 | Wolf et al. | 325/320 |
| 3,474,341 | 10/1969 | Crafts et al. | 178/66 |
| 3,512,087 | 5/1970 | Lewis | 325/320 |
| 3,543,172 | 11/1970 | Seppeler | 178/66 |

*Primary Examiner*—Robert L. Griffin
*Assistant Examiner*—James A. Brodsky
*Attorney*—Abraham A. Saffitz

ABSTRACT: A demodulator for frequency-shift modulated telegraph signals using at least two different signal frequencies, comprising means for deriving from the received wave control signals corresponding to the passages through zero of said wave, means for deriving delayed signals from said control signals, a clock pulse generator having a frequency much higher than said frequencies, means for applying said pulses to a binary counter having a plurality of stages, means for resetting said counter to an initial state by said control signals, and logic circuits means including a storage type data-gating circuit controlled by said control signals and displaying the state of said counter in the form of a group of binary signals. The latter are combined into an analog signal which, after being amplified, is applied to a threshold circuit, and the signals appearing at the output of the latter circuit are applied to a utilization terminal. It is shown that a circuit for modulator operation may be obtained by combining most elements of the demodulator with a frequency divider for the pulse frequency and a decoder.

Figure 1:
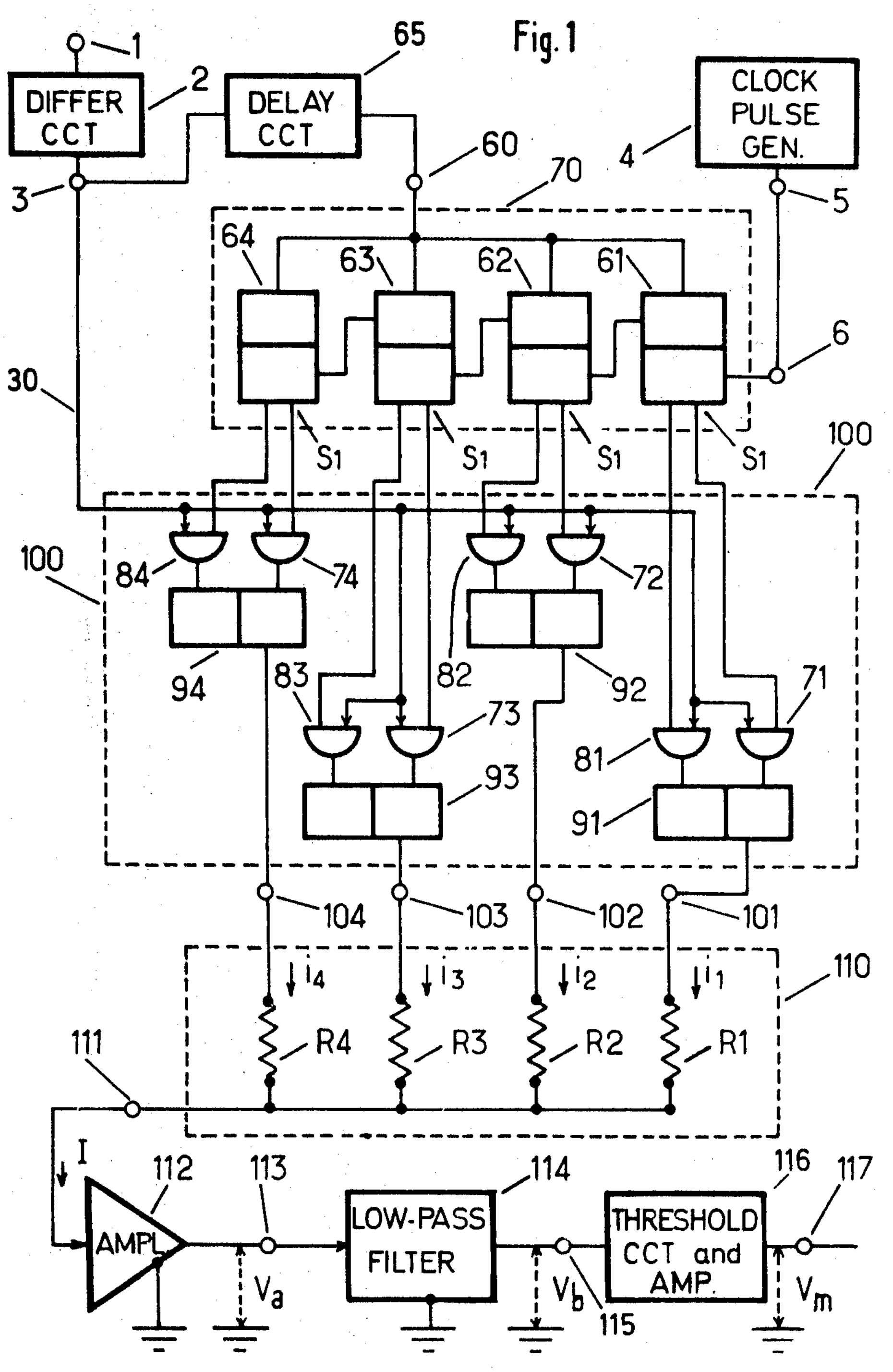

INVENTORS:
MAURICE A. MANIERE
JACQUES K. MEILE

BY: Abraham A. Saffitz
ATTORNEY

INVENTORS:
MAURICE A. MANIERE
JACQUES K. MEIKE

BY: Abraham A. Saffitz
ATTORNEY

INVENTORS
MAURICE A. MAHIEBE
JACQUES K. MEILE
BY: Abraham A. Saffitz
ATTORNEY

INVENTORS:
MAURICE A. MANIERE
JACQUES K. MEILE
BY: Abraham A. Saffitz
ATTORNEY

INVENTORS
MAURICE A. MAMIERE
JACQUES K. MEILE
BY: Abraham A. Saffitz
ATTORNEY

INVENTORS:
MAURICE A. MANIERE
JACQUES K. MEILE
BY: Abraham A. Saffitz
ATTORNEY

FSK DEMODULATOR AND MODULATOR COMBINING DIFFERENTIATED COUNTED SIGNALS INTO A WEIGHTED ANALOG OUTPUT

This invention has as its first subject matter demodulating devices for frequency-shift-modulated telegraphic or similar signals, for instance, data transmission signals—i.e., where modulating signals on a single transmission channel, can assume two or more different signal states consecutively in time, the two or more states being represented by two or more sinusoidal or substantially sinusoidal waves of different predetermined frequencies.

It has been found that the demodulating facilities according to the invention can be used, after a few changes brought about by simple switching operations, as frequency modulators for telegraphic or similar signals. Modulators thus devised therefore from a second subject matter of the invention.

Also, the demodulating and modulating devices according to the invention are, by the nature of the counting and logic circuits which they use, capable of being produced in simple and low-cost forms, for instance, by integrated circuit technique.

The invention has particular advantages in cases in which frequency filtering in a relatively narrow pass band is required for the transmission channel, to limit the occupied frequency band width and to facilitate multiplexing with other channels. A case of this kind is found inter alia in frequency shift harmonic telegraphy (voice-frequency telegraphy) where a number of telegraph channels each use a fraction of a frequency band whose total width is equal to the width of one telephone channel.

It will be assumed by way of example in such a case that the telegraphic signal is a two-state signal whose two states are respectively represented by nominal frequencies $f_1$ and $f_2$. After filtering, the transmitted sinusoidal wave reaches the instantaneous frequency $f_1$ or $f_2$ only after a time which is too long for conventional frequency demodulation methods to yield demodulated (detected) signals whose between-states changeover times are accurately determined and little affected by interference and noise. To obviate this disadvantage, therefore, the invention determines such changeover times by means of a direct method in which such times are determined by the passage of the instantaneous frequency of the received wave through a particular value, for instance, the arithmetic mean $f_0=(f_1+f_2)/2$ of the nominal frequencies $f_1$ and $f_2$. In the case of a transmission system using modulating signals having more than two values, for instance, having four values represented by four frequencies $f_1, f_2, f_3, f_4$, the between-states changeover times can be determined similarly by the times at which the instantaneous frequency of the received wave passes through one or the other of a number of values intermediate the values of two of the four frequencies $f_1, f_2, f_3, f_4$.

One of the advantages of the invention is that, since the invention makes it unnecessary for the received wave to remain at the corresponding nominal frequency for any appreciable length of time so that the state at a particular time of the modulating telegraphic signal can be identified, the filtering of such wave at transmission and at reception need not be very stringent and can be performed by means of simple cheap filters.

Frequency measuring systems are known, for instance, from French specification 1,511,605, which operate on the basis of a $p$-stage binary counter counting, during a half-period or a whole period of the received wave, the number of pulses delivered by a clock pulse generator at a repetition frequency which is much higher than the frequency to be measured. As a rule in such systems, only the or each digit of greatest weight of the group of $p$ binary digits displayed by the counter is used. A disadvantage in this case is that if the result of the counter is near $(2^{p+1}-1)$ or $2^p$, any slight interference to the received wave, for instance, due to noise, may cause a sudden change in the value of the digit of greatest weight of the $p$-digit group, with the result of a large error in frequency measurement (or in the detection of coincidence of such frequency with a predetermined value), the error possibly affecting the detected signal. Appropriate frequency filtering of the detected signal can remove random variations due to interference of this kind, but to be satisfactory any such filtering needs relatively complicated and costly multisection filters.

In the system according to the invention, on the other hand, the detected signal can be filtered just by a very simple low-pass filter, since the disadvantage just outlined is obviated by conversion of all $p$ digits of the group of binary digits into a single analog signal whose value can be impaired very little by such interference. Identity between the measured frequency value and a predetermined value is checked by a threshold circuit which indicates the time at which the magnitude of the latter signal passes through such predetermined value.

The general assumption will be made in the description to be given hereinafter that the modulating signals are two-state signals represented by two predetermined nominal frequencies $f_1$, $f_2$, for although the use of the invention is not limited just to two-state signals, use with two-state signals is the most important practical one.

This invention provides a demodulator for frequency-modulated telegraph signals having at least two different signal states represented by a different respective predetermined nominal frequency of a substantially sinusoidal received wave, the said demodulator comprising:

an input receiving the wave in the form of a substantially sinusoidal voltage whose frequency may vary in time;

means for deriving from such wave, by time differentiation at selected instants when such voltage passes through zero, a control signal corresponding to each such selected instant;

means for deriving a delayed signal from the said control signal;

a clock pulse generator delivering a sequence of clock pulses at a repetition frequency F much higher than any of the said nominal frequencies;

means for applying such sequence to the counting input of a $p$-stage binary counter, $p$ denoting an integer, the said counter displaying the "modulo $2^p$" residue of the number of clock pulses applied thereto when the number exceeds $2^p$;

means for controlling resetting of the counter to a predetermined initial state by the delayed signal, and logic circuit means comprising a storage type data-gating circuit controlled by the said control signal and which displays the state of the counter in the form of at least a portion of a group of $p$ binary signals applied to $p$ display terminals respectively;

the said demodulator being characterized by:

means for combining at least some of the group of $p$ binary signals to form an analog signal formed by a voltage varying in dependence upon the makeup of such group;

means for applying the said analog signal to the input of a threshold circuit formed by cascading a low-pass filter, at least one linear amplifier and a decision circuit having at least one threshold level, and means for applying to a utilization terminal the output signal of said decision circuit.

Preferably, the chosen passages through zero are the passages of the substantially sinusoidal voltage through zero in a predetermined direction.

In the most widely used form of the demodulator according to the invention, the number of the predetermined frequencies is two, the lower frequency hereinafter being called $f_1$ and the higher frequency hereinafter being called $f_2$.

In a preferred form of the demodulator according to the invention, the portion of the group of $p$ binary signals comprises the digits of greatest weight in the binary number counted by the counter.

In a preferred form of the demodulator according to the invention, the initial state is chosen in accordance with rules to be defined hereinafter with the aim of ensuring the required accuracy in determining the instantaneous frequency of the demodulated signal.

The invention also provides a frequency-modulating device using, like the demodulator, a clock pulse generator and a multistage binary counter. Clock pulses of frequency F are applied to the counting input of the binary counter, a number of stages of which are coupled with a corresponding number of inputs of a decoder, operating of the latter being dependent upon a preadjustment governed by the choice of the clock frequency F and of the telegraph frequencies $f_1, f_2$, and upon the instantaneous value of a modulating signal applied to an input. The modulator serves to produce the frequencies $f_1, f_2$ from the frequency F by division thereof by an integer whose value depends upon the state of the decoder, this integer or factor varying in accordance with the instantaneous value of the modulating signal. Clearly, therefore, the modulator just described uses many of the same elements as the demodulator, so that it becomes possible to build a device adapted to operate selectively as a demodulator or as a modulator, through the agency of relatively simple selective switching means acting on the common items. Preferably in this case, the binary counter comprises two partial cascaded counters whose association with one another and with the other items can be varied by switching elements for demodulator or modulator operation. As already stated, the frequencies of the modulated signals are produced by division of the clock pulse repetition frequency F, the division being performed by the partial counters in cooperation with the decoder.

Figure 2:
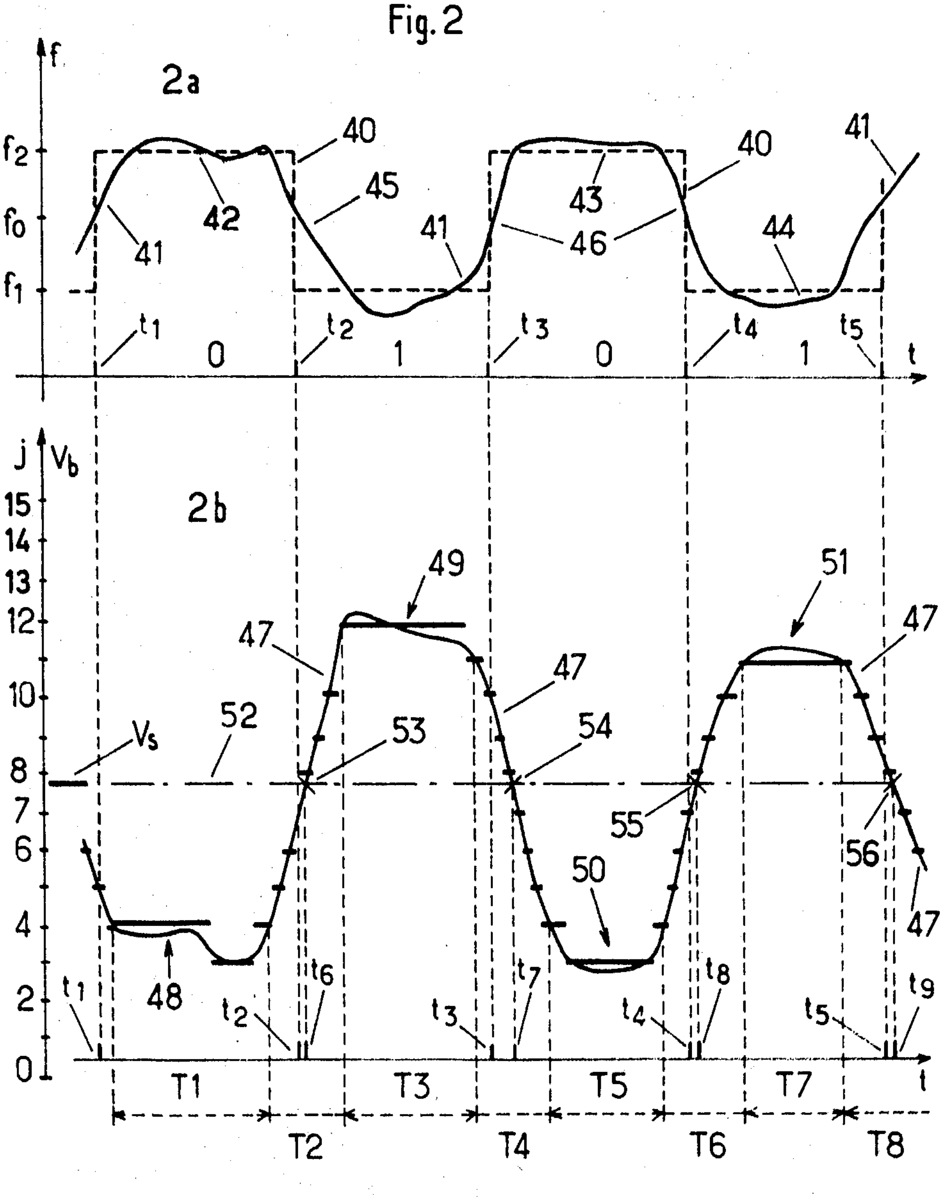
Figure 3:
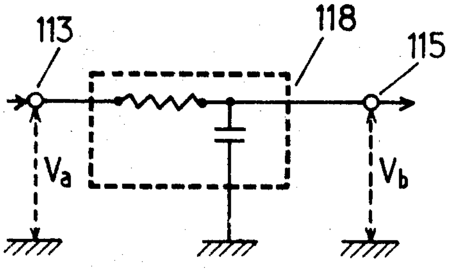
Figure 4:
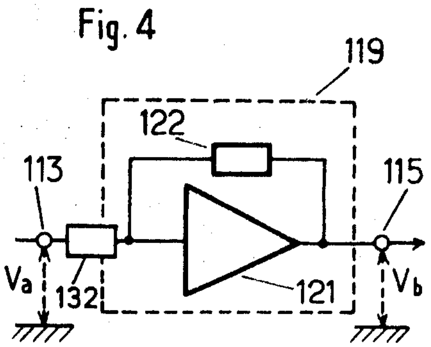
Figure 5:
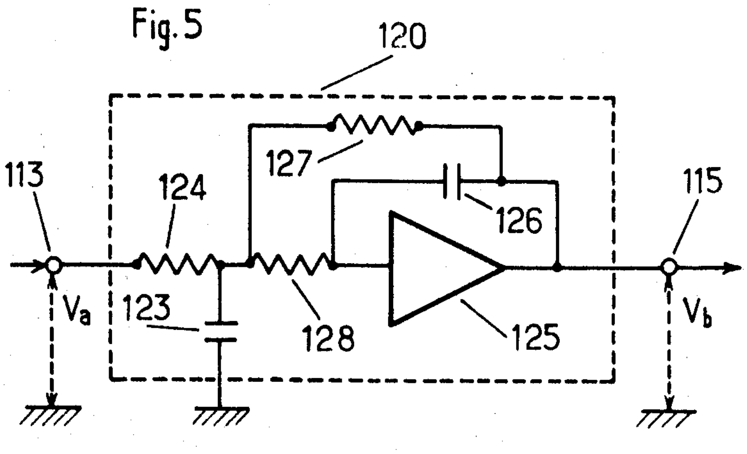
Figure 6:
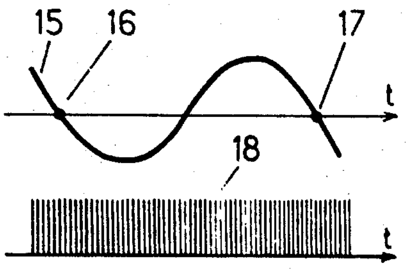
Figure 7:
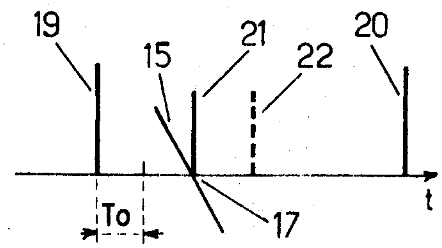
Figure 8:
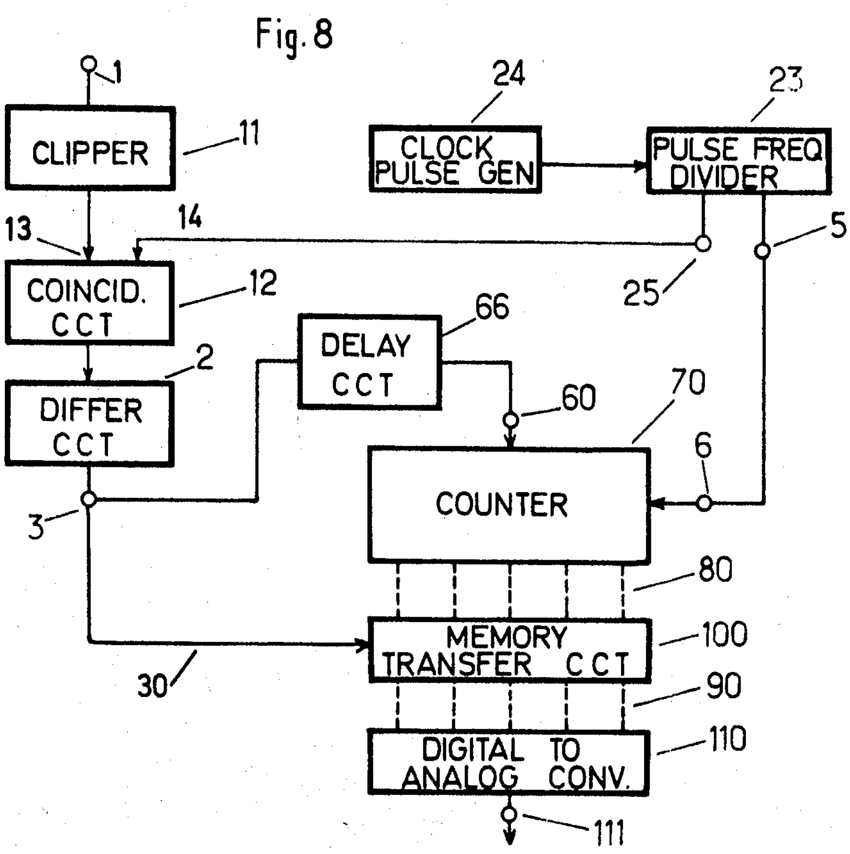
Figure 9:
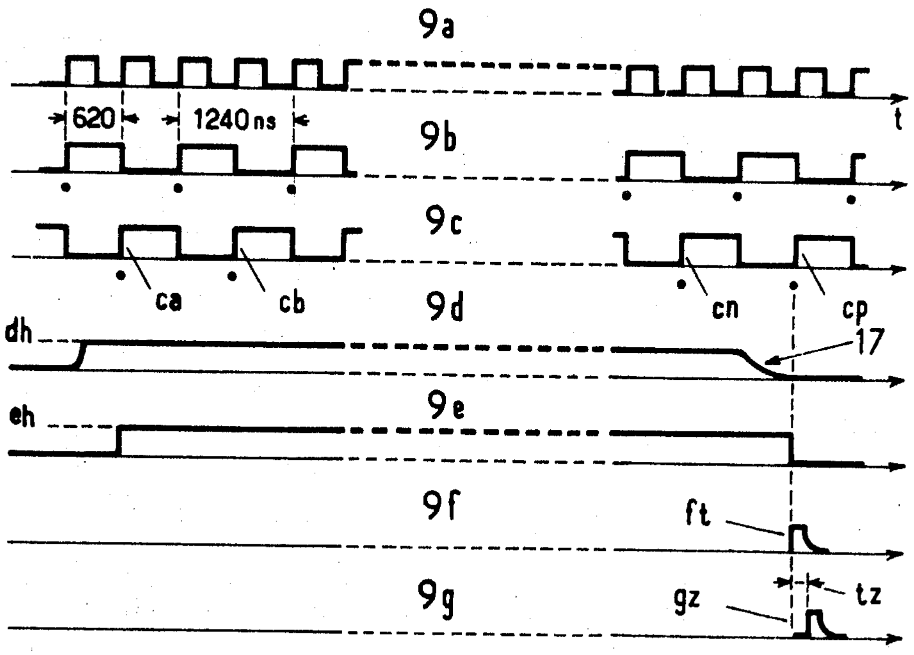
Figure 10:
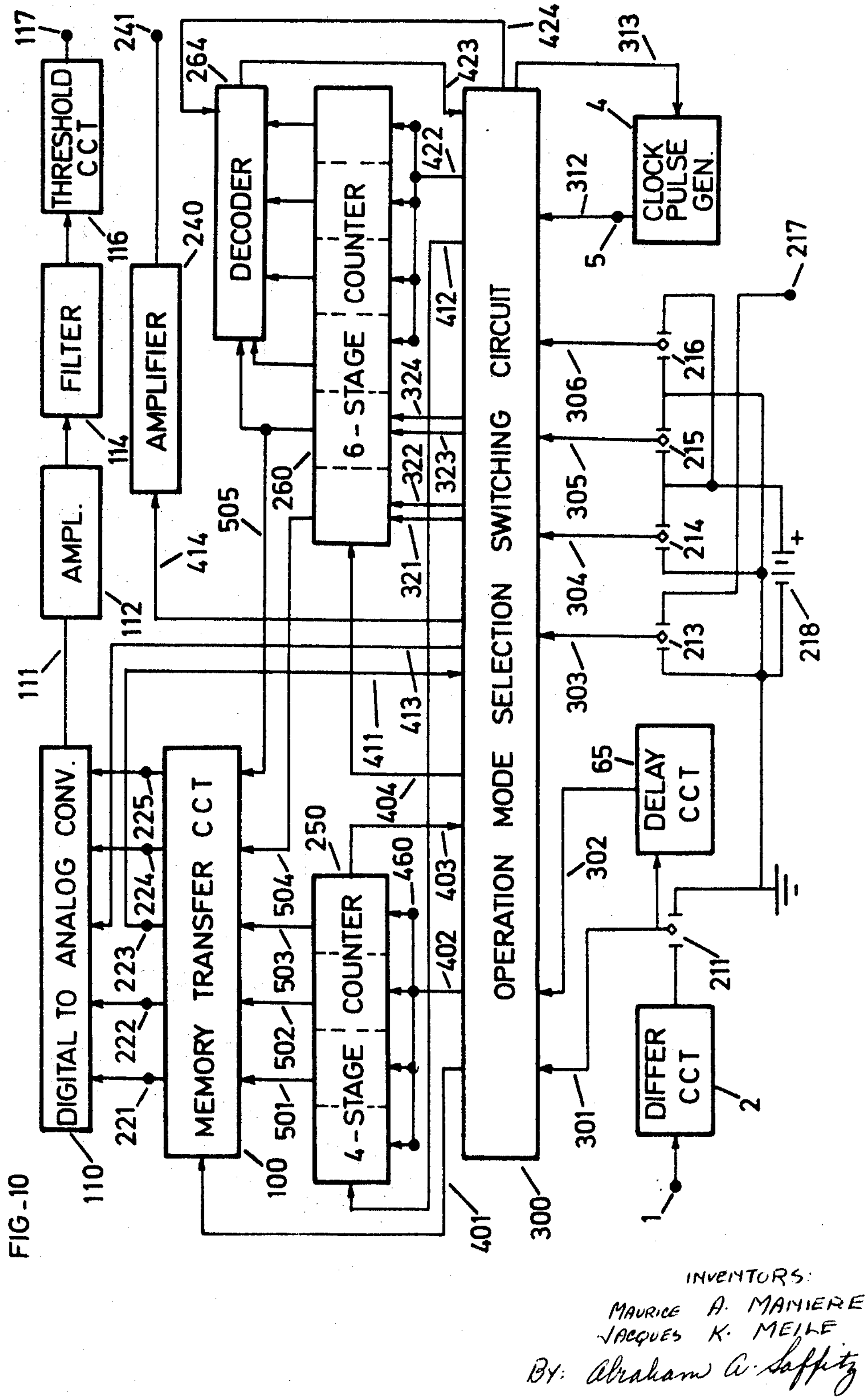

The invention will be more clearly understood from the following detailed description, reference being made to the accompanying drawings, in which:

FIG. 1 is a schematic diagram of a demodulating device according to the invention;

FIG. 2 comprises two graphs 2a and 2b to explain the operation of the device shown in FIG. 1;

FIGS. 3—5 show alternative forms of parts of the device shown in FIGS. 1 and 2;

FIGS. 6 and 7 help to show an operating feature of the same device;

FIG. 8 is a schematic diagram of a preferred embodiment of the demodulator or detector according to the invention;

FIG. 9, with its seven graphs 9a to 9g, helps to show the operation of the embodiment shown in FIG. 8, and FIG. 10 shows an embodiment of the device according to the invention which can be selectively used as either a demodulator or a modulator.

Referring first to FIG. 1, showing a schematic diagram of a demodulator according to the invention, a substantially sinusoidal received wave is applied to the input 1 of a time differentiation circuit 2 which delivers a very brief control pulse at its output 3 whenever the AC signal applied to input 1 passes through zero. Preferably, the control pulse is produced only when such voltage passes through zero in one particular direction, so that two consecutive pulses of this kind are separated by an interval equal to the period of the voltage applied to input 1.

A conventional delay circuit 65 has applied to its input the voltage from output 3 of circuit 2 and transmits the latter voltage with a very slight delay to the zero-resetting input 60 of a binary counter 70 having four stages 61—64 and a counting input 6, the latter being driven by the output 5 of a generator 4 supplying clock pulses having a repetition frequency F. The number *p* has therefore been taken to be 4 in the example shown in FIG. 1.

Each stage of counter 70 can take up two states conventionally called "one" and "zero" and comprises an output $S_1$ at which a voltage appears; such voltage is, for instance, positive when the stage is in the "1" state, whereas when the same voltage appears at a second output of the same stage, the same will be said to be in the "zero" state. The two outputs of each stage are connected to an equal number of different inputs of a logic circuit 100 which also has an actuating or control input energized via connection 30 from output 3.

Circuit 100 comprises four elementary data-gating circuits (71, 81, 91), (72, 82, 92), (73, 83, 93), (74, 84, 94), each comprising two AND gates for instance, 71 and 81, each having one input connected by connection 30 to output 3 and the other input connected to output $S_1$ of a corresponding one of the stages 61—64. Each pair of gates, for instance, the pair 71, 81, drives a bistable circuit, for instance, 91. The circuit arrangement 100 forms a storage type data-gating circuit having four outputs 101—104 connected to the bistable circuit 91—94, respectively. Gating is controlled by any control pulse delivered at output 3, each such pulse bringing the outputs 101—104 respectively into the same state as the output $S_1$ of the corresponding stage 61—64 respectively; alternatively, if the outputs 101—104 are already in the same state as the corresponding outputs $S_1$, the control pulse delivered at output 3 does not cause any change in the state of the outputs 101—104. By way of the delay circuit 65, any control pulse resets the counter to a predetermined initial state which can be the zero state or any other desired state; this resetting occurs after data gating has been effected as far as outputs 101—104.

Circuit arrangement 110 is a digital-to-analog converter shown diagrammatically as a group of four resistances R1, R2, R3, R4, which are of different and appropriately weighted values and which each have one end connected to one of the outputs 101—104 respectively, the other ends being connected to a common output 111 connected to the input of a linear current amplifier 112 delivering at its output 113 a voltage $V_a$ (relatively to a reference potential, for instance, ground potential) proportional to the current I which is the sum of the currents $i_1$, $i_2$, $i_3$; $i_4$ flowing through the respective resistances R1, R2, R3, R4. Output 113 is connected to the input of a low-pass filter 114 whose output 115 is connected to the input of a circuit 116 having an output 117. Circuit 116 comprises a high-gain amplifier followed by a threshold detector which can have one or more threshold levels. If $V_b$ and $V_m$ denote the potentials at the outputs 115 and 117 (relatively to the reference potential), $V_m$ remains zero or very small if $V_b$ is below a threshold $V_s$ (if there is only one threshold), the information which $V_m$ represents in this case having, for instance, the binary value 0. If $V_b$ reaches and exceeds the threshold $V_s$, the output stage of the circuit arrangement 116 is saturated due to the high gain thereof and $V_m$ then assumes a value $V_1$ which is appreciably different from zero and which conventionally represents the "one" value of $V_m$. The analog information formed by the potential appearing at output 111 is therefore converted into a binary numerical data item $V_m$ which appears at output 117 and which has the "zero" value or the "one" value according as the potential appearing at output 111 is below or above a predetermined threshold of $V_b$.

FIG. 2, containing two graphs 2a, 2b, will help to show how the just described device operates. Graph 2a is related to two axes—time along the abscissa and instantaneous frequency along the ordinate. A broken line 40 represents the binary value of the modulating signal, with the value 0 represented by a signal of frequency $f_2$ during the time intervals from $t_1$ to $t_2$ and from $t_3$ to $t_4$, while the value 1 is represented by a signal of frequency $f_1$ during the time intervals from $t_2$ to $t_3$ and from $t_4$ to $t_5$. In practice, due to the filtering of frequency-modulated signals, the actual curve representing instantaneous frequency has a shape something like the solid-line graph 41, as if the frequency were varying continuously between a value near $f_1$ and some other value near $f_2$. The variation in instantaneous frequency is relatively slow in some parts of the curve, such as the parts 42—44, but is much faster in parts such as 45, 46 corresponding to changes in signal state from one frequency to the other. The graph 41 therefore shows the pattern of variation of the instantaneous frequency of the signal. Of course, if more than two frequencies were used the graph 41 would have one or more intermediate steps between its extreme values.

Referring now to graph 2b, which is to the same time scale as graph 2a, time is plotted along the abscissa but the states *j* of the counter of the facility of FIG. 1 are plotted in decimal numbering along the ordinate; the numbers *j* also represent, on an arbitrary but predetermined scale, the decimal value of the voltage $V_a$ proportional to the current I delivered by the converter 110—i.e., to the whole number $j$. The voltage $V_b$ at output 115 of filter 114 is also shown in graph 2b; the scale is not marked but is so devised that two points representing corresponding values $V_a$ and $V_b$ have equal ordinates in the figure.

The values which the counter 70 displays consecutively in time and which are assumed by the voltage $V_a$ are indicated by horizontal marks from 0 to 15 at some of the whole-number levels $j$; the length of each such horizontal line is a proportional representation of the time for which such a given level is maintained. The corresponding consecutive durations succeed one another in time without interruption and without overlapping. Any two consecutive horizontal lines are at different levels spaced apart by one or more units; variations of one unit or two units of the level $j$ are shown in the drawing by way of example. If modulation rates are high, some spacings may be greater than one unit and only some levels may appear, inter alia in the parts where frequency variation is fastest; the time intervals denoted by T1, T3, T5, T7 are the time intervals where frequency variation is slow, and the time intervals T2, T4, T6, T8 are the time intervals in which frequency variation is fast.

In the frequency demodulator shown in FIG. 1, the voltage $V_b$ is produced by the voltage $V_a$ being filtered in the low-pass filter 114. The corresponding pattern of the voltage $V_b$ is represented in graph 2b by a solid-line curve 47, which shows a flattened variation of the levels as compared with the discontinuous representation provided by the horizontal lines. Curve 47 has portions in which frequency variation is slow, which have reference arrows 48—51 and which correspond to the time intervals T1, T3, T5, T7; variation is much more rapid in the intermediate intervals T2, T4, T6, T8. The threshold voltage $V_s$ hereinbefore defined is shown on the graph; a chain-dotted line 52 extending at threshold level intersects curve 47 at points 53—56 whose respective abscissa points are $t6$, $t7$, $t8$ and $t9$.

Random rapid changes in the level are not shown on graph 2b and at the scale thereof, but graph 2b does show that those of such rapid changes which may impair detection of the passage through the threshold $V_s$ concern those steps of $j$ which are near the threshold—i.e., the steps on either side of the points 53—56; clearly, the threshold random variation zone is greatly reduced when the variation of the potential appearing at 111 (or 113) (FIG. 1) has a large number of steps.

In the facility of FIG. 1 the number of steps is defined by the gating circuit 100 controlled via the four stages of counter 70; in some cases, for instance, if the counter has a fairly large number of stages, only some of the counter stages need to be used—actually, those of greatest weight—to provide an adequate reduction of such random variations, the same being still further reduced by filter 114.

Referring now to FIGS. 3—5, which show various embodiments of the low-pass filter of FIG. 1, filter 118 in FIG. 3 comprises an RC network, filter 119 of FIG. 4 is an active filter comprising an amplifier 121 with a negative feedback circuit including two impedances 122, 132 of appropriate design and value, and filter 120 of FIG. 5 is the filter preferred for the purposes of the invention and comprises a capacitor 123 and a resistance 124 and, in series with resistance 124, an amplifier 125 comprising a negative feedback circuit having a capacitor 126 and resistances 127, 128. Filters of this kind, and methods of calculating their elements, are well known in the art.

For satisfactory operation of the arrangement shown in FIG. 1, the various elements which form it are devised to comply with the following conditions, which will become clearly apparent from a study of graph 2b:

a. The mean level between the top-level regions, as 49 and 51, and the bottom-level regions, as 48 and 50, must be substantially equal to the threshold $V_s$;

b. The mean level must correspond to a value of the voltage $V_a$ such that the number $j$ representing such value in the scale of numbers from 0 to ($2^p$) must be near the mean value—i.e., 7 or 8 in the case shown in the drawing—or $2^{p-1}$ or ($2^{p-1}$- 1) if the binary counter of the facility has $p$ stages, and c. The levels (49,51) and (48,50) must be placed near the central points of the intervals ($2^{p-1}$,$2^p$) and (0, $2^{p-1}$) respectively, in which event the difference between these levels is approximately $2^{p-1}$.

Conditions (a) and (b) arise of course from the fact that the value $f_o$ of the instantaneous value of the received wave is selected near the mean of the extreme values (i.e. $f_1$ and $f_2$) which this instantaneous frequency may take up. A practical reason for condition (a) is that the instantaneous frequency of the received wave may occasionally have overshoots such that it may become less than $f_1$ or greater than $f_2$, and so some safety margin must be retained between those values of the level $j$ (FIG. 1, graph 2b) representing $f_1$ and $f_2$ respectively and the extreme values 0 and $2^p$ of the same level, so that the threshold value $V_s$ corresponding to $f_o$ is in a substantially linear part of the curve giving $V_a$ (or $V_b$) in dependence upon the instantaneous frequency.

An explanation will now be given, with reference to a numerical example, of how to select the values of $p$ and F and the initial state of the counter 70 of FIG. 1 for optimum operation of the facility shown therein as regards transmission speed, but without any need for the clock pulse repetition frequency F to be very high.

Using the same references $f_1$, $f_2$ for the nominal frequencies, $f_o$ for their arithmetic mean and T for the duration of the transient condition between two modulating signals representing different signal states (duration T being the same, for instance, as the duration $T_2$ of graph 2b of FIG. 2), the instantaneous frequency is obtained by measuring the time between two passages of the received wave through zero in the same direction by means of "modulo $2^p$" counting of the number of clock pulses of frequency F occurring between such two passages through zero. If it is assumed that the instantaneous frequency varies substantially linearly during the time T, a number ($Tf_o$) of different consecutive instantaneous frequencies expressed by different numbers $j$ will appear substantially during the period T. The minimum and maximum measurable frequencies $f_{min}$ and $f_{max}$ are given by:

$$f_{min}=F/[(q+1)2^p-r] \quad (1)$$

$$f_{max}=F/[Q.2^p-r] \quad (2)$$

$a$ denoting an integer and $r$ denoting the initial counting state of the counter. The measured values lie between these extreme values in such a way that:

$$f_1=F/[(q+3/4)2^p-r] \quad (3)$$

$$f_2=F/[(q+1/4)2^p-r]$$

so as to retain a "safety margin" of $2^p/4F$ between the durations of the times corresponding on the one hand to $f_1$ and $f_{min}$ and on the other hand to $f_2$ and to $f_{max}$ (condition (c) previously referred to). The number of discrete values of the instantaneous frequency which are measurable between $f_1$ and $f_2$—i.e., for any two of which the counted numbers of clock pulses of repetition frequency $F$ differ by at least one unit—is of course:

$$n=F/f_1-F/f_2=2^{p-1} \quad (4)$$

For accurate measurement, $n$ must be at least equal to the number ($Tf_o$) already found in the foregoing, so that:

$$2^{p-1} \geq f_oT$$

or, else $$p \geq 1+log_2(f_oT) \quad (4a)$$

Turning now to the following numerical examples:

Telegraphy at 50 bauds : $T$=12 ms.;

Telegraphy at 100 bauds : $T$=6 ms.;

Telegraphy at 200 bauds : $T$=3 ms.;

with $f_o$=1740 Hz. for 50 bauds ($f_2$–$f_1$=60 Hz.)

$f_o$=1680 Hz. for 100 bauds ($f_2$–$f_1$=120 Hz.)

$f_o$=1560 Hz. for 200 bauds ($f_2$–$f_1$=240 Hz.), the condition given in the foregoing for $p$ checks out in all cases in which $p$ is at least equal to 5.

A description will now be given of how to choose the clock frequency $F$. Combining equations (3) and (4), we obtain:

$$\frac{f_2}{f_1}=\frac{q+\frac{3}{4}-(r/2^p)}{q+\frac{1}{4}-(r/2^p)}$$

$$F=2^{p-1}\frac{f_1\times f_2}{f_2-f_1} \quad (5)$$

$$q=\frac{f_0}{2(f_2-f_1)}-\frac{1}{2}+\frac{r}{2^p} \quad (6)$$

If for a transmission speed $R$ of 40 bauds $f_o$ is taken as 1740 Hz. and $(f_2-f_1)$ is taken as 60 Hz., equation (6) gives for $q$ the whole number 14 for $r=0$, in which event $F=(1710\times1770/60)=807\ 120$ Hz.

On the other hand, in the other two cases considered in the foregoing where $f_o=1680$ Hz. with a rate of 100 bauds ($f_2-f_1=120$ Hz.), and where $f_o=1560$ Hz. with a rate of 200 bauds ($f_2-f_1=240$ Hz.), no whole number is found for $q$ when $r=0$; the counting remainders are not equal to one-fourth of $2^p$ and three-fourths of $2^p$ for $f_1$ and $f_2$ respectively, when $r$ is zero. To make the "modulo 2" counting remainders respectively equal to $(2^p/4)$ and $(3/4\ 2^p)$ for the frequencies $f_1$ and $f_2$, the initial state of the counter is arranged to be not zero but a number $r$ making the quantity $q$ a whole number; this can be done if $r$ is chosen to have an appropriate value less than $2^p$.

The following table summarizes the numerical results in the case of the nominal frequencies $f_1$, $f_2$ and the transmission speeds R hereinbefore considered:

| R, bauds | $f_0$, Hz. | $f_2-f_1$, Hz. | r (decimal value) | r (binary value) | q |
|---|---|---|---|---|---|
| 50 | 1,740 | 60 | 0 | 0 | 14 |
| 100 | 1,680 | 120 | 16 | 10000 | 7 |
| 200 | 1,560 | 240 | 8 | 01000 | 3 |

($p$ was taken as 5 for all the cases considered in the table). It is found, for the three considered values of R and $f_o$, that the corresponding values of F must be 807 120, 375 840 and 161 280 Hz. respectively. If $p$ were taken as 6, the values for F would be twice the values just given.

In a device of the kind shown in FIG. 1, counter operation must not be upset by a data-gating control pulse; for instance, if such a pulse is spaced apart from the immediately preceding counting pulse by an inadequate time interval, the gating control pulse may act before the counting pulse preceding such gating pulse has had time to change over all the counter stages. This risk must be precluded; the counting error is one unit if the disturbance affects only the stage of lowest weight, but if the disturbance affects other stages, more particularly the stages of highest weight, the error may be very large.

FIGS. 6 and 7 give a clear explanation for these error risks. Curve 15 in FIG. 6 represents a period of the signal-forming wave plotted against time, points 16 and 17 on the time axis each denoting the end of any one period and the start of the next; counting pulses 18 are plotted along an equivalent time axis below. In FIG. 7, that portion of the curve which is immediately adjacent the point 17 on both sides thereof is shown to an enlarged scale; also visible are two consecutive counting pulses 19, 20 which are separated from one another by a time interval 1/F. At the time denoted by point 17, a pulse 21 is formed with effect from the passage of curve 15 through zero (in the sense of a decrease in this particular example); after the pulse 19 has contributed to the count, the pulse 21 initiates data gating. The counter operates for a time interval $T_o$ after the passage of a counting pulse. To completely preclude any risk of a miscount, the time interval between pulse 21 and the counting pulse 19 must be appreciably larger than $T_o$; failing this, means can be provided to delay the action of the gating pulse 21 adequately, for instance, by using a series delay circuit in connection 30 which connects output 3 to the data-gating circuit arrangement 100.

FIG. 8 is a block schematic diagram of a preferred form of a device according to the invention, in which the gating control pulse id delayed until halfway through the interval between the two counting pulses 19 and 20, so that the gating control pulse occurs at a position such as 22 (shown in broken lines in FIG. 7)—i.e., with a time stagger of 1/2F relatively to the final counting pulse. This example relates more particularly to the use hereinbefore referred to on 50-baud telegraphy with nominal frequencies of 1710 and 1770 Hz., the counting pulse frequency being 807 120 Hz. and the corresponding period being approximately 1240 nanoseconds. In a prior art method used in the device already described and in that shown in FIG. 8 and which will be described hereinafter, the counter write-in-time is approximately 20—30 nanoseconds per stage—i.e., a maximum of 150 nanoseconds for a 5-stage counter. In this case the pulse 22 is about 600 nanoseconds away from the pulse 19 and there is no risk of a miscount.

The arrangement shown in FIG. 8 comprises the differentiation circuit 2 having an output 3, a delay circuit 66 and a binary counter 70 having a stepping-on input 6 and a zero-resetting input 60. The storage type data-gating circuit arrangement 100 is connected to the counter stages by connections 80 (broken lines); connections 90 (broken lines) connect circuit arrangement 100 to the digital-to-analog converter 110 which has an output 111; that part of the circuit which comes after output 111 is devised in accordance with FIG. 1 and is not shown in FIG. 8. Two circuits 11, 12 are connected in series between the main input 1 and the input of circuit 2; circuit 11 restores the shape of the signal applied to input 1 by clipping, and circuit 12 is a coincidence and storage logic circuit which samples the signal applied to its input 13 by means of a periodic signal applied to another input 14. The last-mentioned signal is formed in a circuit 23 from oscillations produced by a generator 24 at a frequency 2F; circuit 23 has means for dividing the frequency F by 2 at its two outputs 5 and 25, the signals thereat being in phase opposition to one another; output 5 is connected to counter input 6 and output 25 is connected to terminal 14.

The graphs of FIG. 9 explain the operation of the arrangement shown in FIG. 8 and refer to the actual case previously mentioned of voice-frequency telegraphy, the time intervals under consideration being as follows:

period of waves near central frequency and characteristic frequencies: about 600 microseconds period and 300 microseconds half-period;

period of frequency F: approximately 1240 nanoseconds, and period of frequency 2F: approximately 620 nanoseconds.

Graph 9*a* shows the output of oscillator 24 in the form of 620 nanosecond-period rectangular signals, and graphs 9*b* and 9*c* show the rectangular signals delivered by circuit 23 at outputs 5 and 25 respectively, the period of the signals at both the outputs 5 and 25 being 1240 nanoseconds and the signals being in phase opposition. The changes in level of the signals are marked by a dot below the place of level change and correspond to the starts of the respective periods; these changes or transitions form the counting pulse in the case of graph 9*b* and the sampling pulse in the case of graph 9*c*.

Graph 9*d* shows the signal delivered by circuit 11 from the signal applied at input 1 during the half-period terminating at a time as 17 in FIG. 6; the line representing the signal delivered by circuit 11 is a broken line, just as in the other graphs, because of the duration of the half-period which is very long in relation to 620 nanoseconds.

Graph 9*e* represents the signal delivered by circuit 12; at its transition *ca* (output 14, FIG. 8 and graph 9*c*) the signal of graph 9*d* (terminal 13, FIG. 8) is at its high level (*dh*); the signal in graph 9*c* is changing from its low value to its high value (*ch*) but this level change has no effect on the differentiation circuit 2; at the next transitions of the signal in graph 9*c* from (*cb*) to (*cm*) the signal 9*d* is at its high level and is not affected by the latter transitions; at 17 the signal in graph 9*d* is dropping to its low level (at the time marking the end of the period); the next transition (*cn*) (change from low level to high level) coincides with the low level of the signal in graph 9*d* and this coincidence changes over the signal in the graph 9*e* from its high level (*eh*) to its low level. After this transition the circuit 2 produces a pulse (reference *ft* in graph 9*f*) and outputs such pulse at its output 3; the pulse *ft* then triggers data gating. After the pulse *ft*, delay circuit 66 applies to the zero-resetting input 60 (FIG. 8) a slightly delayed pulse $gz$ (graph 9$g$) which resets the counter to zero after the states of the various counter stages have been gated to the outputs of the circuit arrangement 100; the latter outputs store the corresponding data until the next control pulse.

The delay $tz$ of the delay circuit 66 is so chosen that the sum of such delay plus the zero-resetting time of counter 70 (time from the application of a pulse to the zero-resetting input 60) exceeds the minimum holding time for the AND gates of the circuit arrangement 100 which is necessary for satisfactory operation of the bistable elements of circuit arrangement 100. The delay of circuit 66 can be a few tens of nanoseconds; integrated circuit technology may make the delay circuit 66 unnecessary since the zero-resetting time may on its own exceed the minimum holding time for the AND gates of the circuit arrangement 100.

A description will now be given to show how, by means of a system using most of the same items as in FIG. 1, it is possible to devise a modulator for frequency-shift-modulated telegraphy or data transmission and a demodulator for the same kind of signal. Both the demodulator and the modulator therefore use largely the same working units, but connected up differently through the agency of an appropriate selective switching circuit. A system of this kind is of course economically advantageous, enabling as it does the same working units to be used to construct facilities for which different elements have previously been required and thus enabling the number of different kinds of element used in a given total number of communication circuits to be reduced.

Returning to the three examples given in the foregoing of telegraphy at transmission speeds R of 50, 100 and 200 bauds for any value of $p$ and with normal transmitted frequencies $f_1$, $f_2$ of 1710 and 1770, 1620 and 1740, 1440 and 1680 Hz., respectively, the quotients $Q_1$, $Q_2$ arising from division of the clock-pulse repetition frequency F by the frequencies $f_1$ and $f_2$ are:

in the first case:

$$Q_1=F/1710=59.2^{p12}$$
$$Q_2=F/1770=57.2^{p12}$$

in the second case:

$$Q_1=F/1620=29.2^{p12}$$
$$Q_2=F/1740=27.2^{p12}$$

in the third case:

$$Q_1=F/1440=14.2^{p12}$$
$$Q_2=F/1680=12.2^{p12}$$

The formulas just given show that signals of frequencies $f_1$ and $f_2$ can always be obtained from clock pulses of frequency F by relatively simple frequency division operations which are purely prior art.

If $p$ is now taken as 6, then F, $Q_1$ and $Q_2$ will be found in each case to be twice what they were when $p$ was 5, so that for $p=6$:

for $R=50$ bauds:

$$F=1\,614\,240\text{ Hz.}$$
$$F/f_1=Q_1=59\times16$$
$$F/f_2=Q_2=57\times16$$

for $R=100$ bauds:

$$F=751\,680\text{ Hz.}$$
$$F/f_1=Q_1=29\times16$$
$$F/f_2=Q_2=27\times16$$

for $R=200$ buauds:

$$F=322\,560\text{ Hz.}$$
$$F/f_1=Q_1=14\times16$$
$$F/f_2=Q_2=12\times16$$

Correlatively, the initial-state values required for the counter when $p$ is 6, characterized by the number $r$ hereabove defined, are respectively for the cases just set forth:

$$r=0;\ r=32 \text{ and } r=16.$$

The block-schematic diagram of FIG. 10 shows how a modulator and a demodulator can be devised at choice in the three cases just described—although without limitation just to these three cases—on the basis of the same working units, together with the oscillators at the frequencies $f_1$ and $f_2$ which are required for operation of the modulator, by different interconnections between the units and by the use of a small number of extra elements. In FIG. 10, where elements which are the same as in FIG. 1 have the same references, there can be seen: the input 1 for the wave to be detected; the time differentiating circuit 2 which prepares control pulses from the passages of such wave through zero; the delay circuit 65 which receives the control pulses and delivers delayed control pulses; the clock pulse generator 4; the storage type gating circuit 100; and the digital-to-analog converter 110 with its output 117 where the detected signal is received. In FIG. 10 the four-stage counter of FIG. 1 is replaced by a six-stage counter formed by cascading two partial binary counters 250, 260 having four and six stages respectively, only some of the stages being used for demodulator operation. For demodulator operation too, counter 250 is followed by counter 260 in the cascade, whereas the order is reversed for modulator operation. The interconnection changes just referred to and other interconnection changes are the responsibility of a main operation selector circuit 300 whose operation is controlled by ordinary e.g. manual two-way switches 211, 213—216, as will be described hereinafter.

Also visible in FIG. 10 are the following extra elements which are absent from FIG. 1 and which are not required for demodulator operation but are necessary for modulator operation. These extra elements are: input 217 for the modulating signals; a decoding circuit 264 which in cooperation with the counters 250, 260 divides the clock pulse frequency F by a factor $Q_1$ or $Q_2$ which is other than a power of 2 and which can be e.g. 57 or 59, 27 or 29 or 12 or 14, so that after a second division by 16 of the result of the first division, the frequencies $f_1$ and $f_2$ are produced from the frequency F by the procedure hereinbefore described; and an amplifier 240 and an output 241 for frequency-shift-modulated signals.

For demodulator operation the circuit arrangement shown in FIG. 10 operates as follows:

The wave to be detected is received as a voltage at the time differentiation circuit input 1; the time differentiation circuit 2 delivers control pulses corresponding to at least part of the passages of such voltage through zero. The selector 214 is placed in its left-hand position so that, through the agency of relays in circuit 300, a direct link is made between connection 301 and connection 401 (serving the same purpose as 30 in FIG. 1) extending from circuit 300 towards the control input of circuit 100 (as in FIG. 1). A direct link is also made between connection 302 and connection 402 which extends from circuit 300 to zero-resetting input 460 which serves the same purpose for the four-stage counter 250 as does the circuit 60 for the counter 70 in FIG. 1—i.e., enabling the counter 250 to be reset to a predetermined initial state by delayed control pulses coming from 65. When placed in its left-hand position in the drawing, switch 211 allows the pulses from circuit arrangement 2 to pass to the selective switching circuit 300. Delayed control pulses are delivered by delay circuit 65 via connection 302 to circuit 300. When in the left-hand (detection) position, the switches 213, 214 earth the connections 303, 304 associated with circuit 300. When in their right-hand position, switch 213 links connection 303 to the modulating signal input 217 and switch 214 links connection 304 to the positive side of a DC source 218 whose negative side is grounded. Changing the potential of the connection 304 acts, by way of electromechanical or electronic relays in circuit 300, to produce different interconnections between the various connections extending to the circuit 300, according as demodulator or modulator operation has been selected.

By using three out of four possible paired combinations of their positions, the two-way switches 215, 216 enable each of the connections 305 and 306 to the circuit 300 to be brought to one or the other of two different potentials (ground potential or the positive potential of DC source 218), with the result, through the agency of relays in circuit 300, that the connections of the counters 250 and 260 are arranged for one or other of the three types of telegraph operation referred to (50, 100, and 200 bauds) and the initial state of the counters is made appropriate for the particular case concerned. Simultaneously, clock pulse generator 4 is set to the appropriate frequency F via the connection 313.

For demodulation, when the switches 213 and 214 are in their left-hand position, a direct link is made in the circuit 300 between the connection 312 from the clock pulse generator 4 and the connection 412 extending to the counting input of counter 250, and another direct link is made in circuit 300 between the counting output connection 403 of counter 250 and the counting input 404 of counter 260. Fixed connections 501—505 connect the second, third and fourth stages of counter 250 and the first and second stages, respectively, of the counter 260 to five inputs of the gating circuit 100 which have five outputs 221—225 connected to five corresponding inputs of the digital-to-analog converter 110 (serving the same purpose as the element 110 in FIG. 1), the latter connection being direct in the case of outputs 221, 222, 224, 225 and by way of a link in circuit 300 between connections 411 and 413 in the case of output 223. Converter output 111 is connected to the input of the system 112, 114, 116 (as in the case in FIG. 1) and the demodulated signals are received at output 17.

Consequently, when the system operates as a detector in the manner just described, six counting stages are used which comprise all the counting stages of counter 250 plus the first two stages of counter 260 (corresponding to the case of $p=6$), whereas in the gating circuit 100 and converter 110 the signals delivered by the first stage of counter 250 are not used; since the last-mentioned stage is the stage of least weight, the required accuracy can be obtained by using the five other stages of the assembly 250, 260.

The connection pairs (321, 322) and (323, 324) associated with the first two stages of the counter 260 each have one or the other of their elements connected inside circuit 300 to the connection 402 conveying the delayed pulses from the delay circuit 65, according to the selected transmission rate, by means of the switches 215, 216, so that the delayed pulses from the delay circuit 65 can bring the first two stages of the counter 260 to the appropriate initial state which depends upon the value of the number $r$ which, as already explained, may be 0 or 32 or 16. The initial state which the delayed pulses coming over the line 402 to the point 460 impart to the four stages of the counter 250 is always the zero state. In demodulator operation the last four stages of counter 260 are zero reset via a connection made in circuit 300 between line 302 for the delayed pulses from delay circuit 65 and the common line 422 extending from circuit 300 to the last four stages of counter 260. Through the agency of the decoder 264, the last-mentioned counters ensure that the connections between the lines 301 and 401 and between 302 and 402 or 302 and 422 are made only once a particular counting state (14 for 50 bauds, 7 for 100 bauds and 3 for 200 bauds) has been reached.

A description will now be given of how the elements shown in FIG. 10 are arranged for modulator operation. Line 301 is grounded by switch 211 (right-hand position thereof in FIG. 10), so that control pulses cannot reach 401 and 402 via 301 and 302. Placing switch 213 in its right-hand position connects line 303 associated with circuit 300 to terminal 217 where the modulating signals are applied. When in the right-hand position the switch 214 connects line 304 associated with circuit 300 to the positive side of the DC source 218 to produce via relays alterations, to be described in detail, in the interconnections in circuit 300.

Line 312 from clock pulse generator 4 is now connected to counting input line 404 of the six-stage counter (instead of being connected as it was previously to 412). Line 312 is also connected to line 401 which is now isolated from 301, so that output 223 of circuit arrangement 100 can copy, with a delay of less than half the clock pulse period, the state of the third stage of counter 250. The outputs of the last five stages of counter 260 are connected by five corresponding lines to five inputs respectively of decoder 264 whose output is connected by line 423 to circuit 300, in which a link is now made between 423 and the common line 422 which ceases to be connected to 302 and 402 in circuit 300. However, a connection is made therein between 422 and those of the lines 321—324 which the switches 215, 216 have rendered operative; line 402 is isolated from 302.

Terminal 223 remains connected to line 411 but the latter ceases to be connected in circuit 300 to line 413, and so terminal 223 is now isolated from the converter 110. However, line 411 is now connected inside circuit 300 to line 414 and hence to the input of an amplifier 240 whose output is connected to a terminal 214 where the frequency-shift-modulated wave modulated by the modulating signals applied to terminal 217 can be sampled. Output line 423 of decoder 264 is connected inside circuit 300 to line 412 extending to the counting input of counter 250.

Also present between circuit 300 and decoder 264 is a line 424 (shown in FIG. 10 as a single line but in fact being a multiple line) which acts in dependence upon the positions of the switches 213—216 and, more particularly, in dependence upon the potentials applied to 305 and 306 via 215 and 216 and upon the potential of 217 applied to 303 via 213, to adjust decoder operating conditions in a manner to be described hereinafter.

Operation is as follows:

The clock pulses of frequency F go via 312 and 404 to the counting input of the counter and to line 401. The outputs of each of the last five stages of counter 260 are connected to decoder 264 whose output is connected inside circuit 300 to lines 412 and 422 via line 423, as previously described. The decoder, in cooperation with the counter 260, is adapted to divide the frequency F by the quotient by 16 of one or other of the factors $Q_1$, $Q_2$, for instance, 59, or 29 or 14 in the case of $Q_1$ and 57 or 27 or 12 in the case of $Q_2$ (assuming that the initial state for the first two stages of counter 260 is the zero state, through the agency of appropriate control voltages derived e.g. from the potential of 305). The required adaptation of the decoder 264 is controlled by the potentials transmitted via 424 on the basis of the modulating signal applied to 303 via 213 and by the potentials applied to 305 and 306 from 218 via 215 and 216. The counter 250 then performs the frequency division by 16, the counting input of counter 250 being connected to the output of decoder 264 by a link between lines 412 and 423 inside circuit 300.

The formation of a division factor of the kind hereinbefore referred to, for instance, the factor 57, through the agency of a decoder and binary counter forms part of the prior art and need not be described in detail here.

After the division by 16 a periodic signal of frequency $f_1$ or $f_2$ appears at terminal 223 and goes therefrom through amplifier 240 to terminal 241 as previously described.

If, to simplify the demodulation-modulation changeover switching elements, it is desired not to have to modify in such changeover the initial states of the first two stages of the counter 260 (such states being 0 and 1 respectively for 100 bauds and 1 and 0 for 200 bauds), all that need be done is to adjust the setting of the decoder 264 so that counter 260 returns to its initial state when it reaches states derived from the 57 or 59, 27 or 29 or 12 or 14 states depending upon the selected transmission speed of 50 or 100 or 200 bauds, by a modification serving to allow for the fact that the initial state chosen for one or the other of the first two stages of the counter 260 for demodulation is the "one" state instead of the "zero" state for transmission speeds of 100 and 200 bauds.

The numerical values hereinbefore specified for frequencies, transmission speeds and division factors are of course purely exemplary, and the invention can, by the use of conventional calculation rules, be adapted to any other numerical values of the quantities hereinbefore set forth which are in appropriate relationships with one another. Also, of course, the word "relay" hereinbefore employed refers preferably to an electronic semiconductor relay which can of course be embodied at reduced cost and with reduced dimensions.

If integrated circuit technology is used, more particularly by the use of bistable circuits of the type known as "master-slave" (MS in abbreviated form), all the logic and switching circuits used in the facility according to the invention can be devised with a specific integrated circuit structure without departure from the scope of the invention.

What we claim is:

1. A demodulator device for frequency-modulated telegraphic signals having at least two different signal states represented by a different respective predetermined nominal frequency of a substantially sinusoidal received wave, said device comprising:

an input receiving the wave in the form of a substantially sinusoidal voltage whose frequency may vary in time;

means for deriving from such wave, by time differentiation at selected passages of said voltage through zero, a control signal corresponding to each such selected passage;

means for deriving a delayed signal from said control signal;

a clock pulse generator delivering a sequence of clock pulses at a repetition frequency F much higher than any of said nominal frequencies;

means for applying said sequence to the counting input of a $p$-stage binary counter, $p$ denoting an integer, said counter displaying the "modulo $2^p$" residue of the number of clock pulses applied thereto;

means for controlling resetting said counter to a predetermined initial state by said delayed signal, and logic circuit means comprising a storage type data-gating circuit controlled by said control signal and displaying the state of the counter in the form of a group of $p$ binary signals applied to $p$ display terminals respectively, said device further comprising means for combining at least part of said group of $p$ binary signals to form an analog signal formed by a voltage varying in dependence upon the makeup of said group;

means for applying said analog signal to the input of a threshold circuit formed by cascading a low-pass filter, at least one linear amplifier and a decision circuit having at least one threshold level, and means for applying to a utilization terminal the signal delivered by said decision circuit.

2. A device as claimed in claim 1, in which said selected passages through zero are the passages of said substantially sinusoidal voltage through zero in a predetermined direction.

3. A device as claimed in claim 1, in which said predetermined frequencies are two in number and are both submultiples of said frequency F.

4. A device as claimed in claim 1, in which said part of said group of $p$ binary signals comprises the digits of greatest weight in the binary number counted by said counter.

5. A device as claimed in claim 1, in which said initial state is a state other than zero for at least part of said $p$ stages of said counter.

6. A device as claimed in claim 1 adapted to operate at will as a demodulator or as a modulator through the agency of selective switching means providing different connections between the elements of said device according to the selected operation, in which:

said binary counter comprises a first partial counter and a second partial counter cascaded in an order which varies according to whether demodulator operation or modulator operation is selected;

said device comprises means for selectively applying, according to the selected form of operation, said clock pulses to the counting input of a selected one of said partial counters;

said device also comprises, for modulator operation, an input for modulating signals, a frequency-modulated wave output, and a frequency-dividing circuit formed by a decoder having a number of inputs connected one each to a number of stages of said selected partial counter and an output for the resetting thereof to said initial state, latter said output being connected to all the stages of the latter partial counter and to the counting input of the other of said partial counters;

said storage type gating circuit always displays the respective states of at least part of the stages of said first and second partial counters at a corresponding number of display terminals; and said frequency-modulated wave output is connected to a selected one of latter said display terminals.

7. A device as claimed in claim 6, in which said frequency-modulated wave output is connected by an amplifier to latter said selected one of said display terminals.

8. A device as claimed in claim 1, in which a clipper circuit is provided between said wave receiving input and said time differentiation means.

9. A device as claimed in claim 8, in which a sampling circuit controlled by said clock pulse generator is introduced between said clipper circuit and time differentiation means.